United States Patent
Nakamura et al.

[11] Patent Number: 5,992,557
[45] Date of Patent: Nov. 30, 1999

[54] ELECTRIC POWER STEERING APPARATUS

[75] Inventors: Yoshito Nakamura; Yasuo Shimizu, both of Wako, Japan

[73] Assignee: Honda Giken Kogyo Kabushiki Kaisha, Tokyo, Japan

[21] Appl. No.: 09/056,730

[22] Filed: Apr. 7, 1998

[30] Foreign Application Priority Data

Apr. 8, 1997 [JP] Japan .................................. 9-089786

[51] Int. Cl.$^6$ ........................................................ B62D 4/04
[52] U.S. Cl. ............................. 180/446; 180/443; 701/42
[58] Field of Search .................................. 180/443, 446; 701/41, 42; 318/432, 434

[56] References Cited

U.S. PATENT DOCUMENTS

| | | | |
|---|---|---|---|
| 5,182,711 | 1/1993 | Takahashi et al. . | |
| 5,425,574 | 6/1995 | Sano . | |
| 5,467,281 | 11/1995 | Iwashita et al. . | |
| 5,612,877 | 3/1997 | Shimizu et al. . | |
| 5,698,956 | 12/1997 | Nishino et al. ........................ | 180/443 |
| 5,839,537 | 11/1998 | Nishino et al. ........................ | 180/443 |
| 5,927,430 | 7/1999 | Mukai et al. ........................... | 180/446 |

*Primary Examiner*—Daniel G. DePumpo
*Attorney, Agent, or Firm*—Merchant & Gould P.C.

[57] ABSTRACT

An electric power steering apparatus includes a steering assist torque control system in which a steering torque signal is input and a motor speed signal is output. The control system includes a main control value setting section having a gain KTT and setting a target assist torque value corresponding to the steering torque, a differential-value correction value setting section having a gain KTD and setting a differential-value correction value corresponding to a differential steering torque value, a motor having an inertial efficiency JM and a counter electromotive force (induced voltage) constant KE, a motor drive section incorporated in a controlled object and having a proportional gain KP, a steering speed correction value setting section having a gain KTR and setting a steering speed correction value corresponding to the motor speed signal. The ratio of the gain KTD to the gain KTT is set to satisfy the condition: $KTD/KTT > JM/\{\alpha(KP \cdot KTR + KE)\}$ where $\alpha = KT/(R+KP)$, R is the resistance (winding resistance) of the electric motor, and KT is the torque constant of the electric motor. With this arrangement, the phase of a gain of the steering assist torque control system is advanced, thereby improving the response characteristic to a level at least comparable to the manual steering mechanism.

1 Claim, 5 Drawing Sheets

ELECTRIC POWER STEERING APPARATUS

BACKGROUND OF THE INVENTION

1. Field of the Invention

The present invention relates to improvements in an electric power steering apparatus which provides power assist of an electric motor directly to a steering system so as to reduce manual steering effort to be applied by the driver.

2. Description of the Related Art

FIG. 1 of the accompanying drawings diagrammatically shows the general construction of an electric power steering apparatus of the type concerned. The electric power steering apparatus 1 includes an electric motor 10 incorporated in a steering system, and a control unit 20 for controlling power assist supplied from the electric motor 10, so as to reduce the manual steering effort or force required by the driver.

The steering system includes a steering wheel 2 attached to an end of a steering shaft 3. The opposite end of the steering shaft 3 is connected to one end of a connecting shaft 4 via a first universal joint 4a, the other end of the connecting shaft 4 being connected via a second universal joint 4b to a pinion 6 of a rack-and-pinion mechanism 5. The pinion 6 is in mesh with a rack 7 which is a long bar with gear teeth 7a cut into one side. The rack-and-pinion mechanism 5 translates a rotary motion of the pinion 6 into an axial reciprocating motion of the rack 7. Opposite ends of the rack 7 are connected via tie rods 8 to steerable left and right front wheels 9, 9. When the steering wheel 2 is manually turned or rotated in a desired direction, the rack-and-pinion mechanism 5 and the tie rods 8 cause the front wheels 9 to pivot in the same direction to thereby change the direction of movement of a motor vehicle.

In order to reduce the manual steering effort or force required by the driver, the electric motor 10 is disposed in concentric relation to the rack 7 and supplies an assist torque (steering assist torque) to the rack 7 via a ball screw mechanism 11. The ball screw mechanism 11 converts rotational power of the electric motor 10 into an axial thrusting force acting on the rack 7. The ball screw mechanism 11 is generally comprised of a nut 12 connected to a rotor of the electric motor 10, and a threaded screw portion 7b formed along a longitudinal portion of the rack 7. By virtue of the threaded engagement between the nut 12 and the threaded screw portion 7b, a rotational force of the nut 12 is converted into an axial thrusting force of the rack 7. Thus, the assist torque generated by the electric motor 10 is translated into the axial thrusting force of the rack 7 by which manual steering effort required by the driver to turn the steering wheel 2 is reduced.

A steering torque detecting section (steering torque sensor) 18 detects a manual steering torque Ts acting on the pinion 6 and supplies a torque signal Tp indicative of the detected steering torque Ts to the control unit 20. The control unit 20 outputs, on the basis of the torque signal Tp, a motor control signal 20a to control output power (steering assist torque) of the electric motor 10.

FIG. 2 of the accompanying drawings shows in block diagram the general arrangement of a conventional control unit. The control unit 20A includes a target assist torque determining section 201 and a motor drive section 202. The target assist torque determining section 201 determines a target assist torque on the basis of the torque signal Tp and outputs the determined target assist torque in the form of a target assist torque signal 201a. More specifically, the target assist torque determining section 201 sets the target assist torque to be zero when an absolute value of the steering torque is less than a predetermined dead zone threshold. Conversely, when the absolute value of steering torque is greater than the predetermined dead zone threshold, a target assist torque which is proportional to the steering torque is output from the target assist torque determining section 201. The target assist torque output from the target assist torque determining section 201 is limited below an upper limit even when the steering torque increases excessively.

The motor drive section 202 determines an offset between the target assist torque signal 201a supplied from the target assist torque determining section 201 and a motor current signal IM supplied from a current detector (not shown) provided to detect a current actually flowing in the electric motor 10, and generates a motor drive signal 20a in such a manner as to render the offset zero. The motor drive signal 20a is supplied to the electric motor 10 with the result that the target assist torque is supplied from the electric motor 10.

FIG. 3 shows in block diagram the general arrangement of another conventional control unit. The control unit 20B includes a first target assist torque determining section 211, a steering torque differentiating section 212, a second target assist torque determining section 213, an adding section or adder 214, and a motor drive section 202.

The first target assist torque determining section 211 determines a first target assist torque on the basis of the torque signal Tp and outputs the determined first target assist torque in the form of a first target assist torque signal 211a. More specifically, the first target assist torque determining section 211 sets the first target assist torque to be zero when an absolute value of the steering torque is less than a predetermined dead zone threshold. Conversely, when the absolute value of steering torque is greater than the predetermined dead zone threshold and less than a predetermined threshold, a first target assist torque which is proportional, with low gain, to the steering torque is output from the first target assist torque determining section 211. A steering torque greater than the predetermined threshold causes the first target assist torque determining section 211 to output a first target assist torque which is proportional, with high gain, to the steering torque. The first target assist torque output from the first target assist torque determining section 211 is limited below an upper limit even when the steering torque increases excessively.

The steering torque differentiating section 212 determines a variation per unit time of the torque signal Tp and outputs the determined variation in the form of a differential torque signal 212a (Tp·s in a Laplace transform range).

The second target assist torque determining section 213 determines a second target assist torque on the basis of the differential torque signal 212a and outputs the determined second target assist torque in the form of a second target assist torque signal 213a. The second target assist torque output from the second target assist torque determining section 213 is limited below an upper limit even when the differential torque value becomes excessively large.

The adder 214 adds together a signal 211a corresponding to the first target assist torque and a signal 213a corresponding to the second target assist torque and outputs the result of arithmetic operation (addition) in the form of a target assist torque signal 214a.

The motor drive section 202 determines an offset between the target assist torque signal 201a supplied from the target assist torque determining section 201 and a motor current signal IM supplied from a current detector (not shown) provided to detect a current actually flowing in the electric motor 10, and generates a motor drive signal 20a in such a manner as to render the offset zero. The motor drive signal 20a is supplied to the electric motor 10 with the result that the target assist torque is supplied from the electric motor 10.

The conventional control unit 20A shown in FIG. 2 seeks to improve the response characteristic by adjusting gain of the gain of a steering power assist system in which the input is the steering torque signal Tp and the output is the motor drive signal 20a or the steering assist torque supplied from the electric motor 10. The conventional control unit shown in FIG. 3 seeks to enhance the response characteristic by achieving adjustment of the gain of the steering power assist system in response to variations of the steering torque. The conventional control units, however, have a drawback that an excessively high gain of the steering power assist system would harm the operational stability of the steering power assist system. Another drawback with the conventional control units is that due to the influence of an inertial efficiency of the electric motor and a friction produced in a speed reducing mechanism, a sufficiently high level of response cannot be achieved. The conventional electric power steering apparatus as a whole cannot perform steering operation with steering feeling (response characteristic) at least comparable to that of the manual steering apparatus.

SUMMARY OF THE INVENTION

With the foregoing drawbacks in view, it is an object of the present invention to provide an electric power steering apparatus which is capable of achieving a steering feeling (response characteristic) at least comparable to that of the manual steering apparatus.

According to the present invention, there is provided an electric power steering apparatus which comprises: an electric motor for providing an assist torque to a steering system; a steering torque sensor for detecting a steering torque of said steering system and generating a steering torque signal indicative of the detected steering torque; a steering torque differentiating section for obtaining a differential value of the steering torque and generating a differential steering torque signal corresponding to the differential value of the steering torque; a motor speed sensor for detecting a rotational speed of said electric motor and generating a motor speed signal corresponding to the detected rotational speed of said electric motor; a target current setting section for setting a target motor current on the basis of at least the steering torque, the differential value of the steering torque, and the rotational speed of said electric motor; a current sensor for detecting a current actually flowing in said electric motor; an offset calculating section for calculating an offset between the target motor current and the current actually flowing in said electric motor; and a motor drive section for driving said electric motor on the basis of the offset. The electric motor, the steering torque sensor, the steering torque differentiating section, the motor speed sensor, the target current setting section, the offset calculating section and the motor drive section jointly forms a steering assist torque control system in which the steering torque signal is input and the motor speed signal is output. The differential torque signal has a proportional gain KTD, the steering torque signal has a proportional gain KTT, the electric motor has an inertial efficiency JM, the motor drive section has a proportional gain KP, the motor speed signal has a proportional gain KTR, and the electric motor has a counter electromotive force constant KE. The ratio of the proportional gain of the differential steering torque signal to the proportional gain of the steering torque signal is set to satisfy a relation indicated by Expression: KTD/KTT>JM/{α(KP·KTR+KE)} where α=KT/(R+KP), R is the resistance of the electric motor, and KT is the torque constant of the electric motor, thereby advancing the phase of a gain of the steering assist torque control system.

By virtue of the proportional gain ratio between the differential steering torque signal and the steering torque signal which is set to satisfy the relation: KTD/KTT>JM/{α(KP·KTR+KE)}, the gain of the steering assist torque control system is advanced, with the result that the steering assist torque control system has a response characteristic at least comparable to that of the manual steering apparatus.

The above and other objects, features and advantages of the present invention will become manifest to these versed in the art upon making reference to the detailed description and the accompanying sheets of drawings in which a preferred structural embodiment incorporating the principles of the invention is shown by way of illustrative examples.

DETAILED DESCRIPTION OF THE PREFERRED EMBODIMENT

A preferred embodiment of the present invention will be described in greater detail with reference to FIGS. 4 through 6B of the accompanying drawings.

Figure 4:
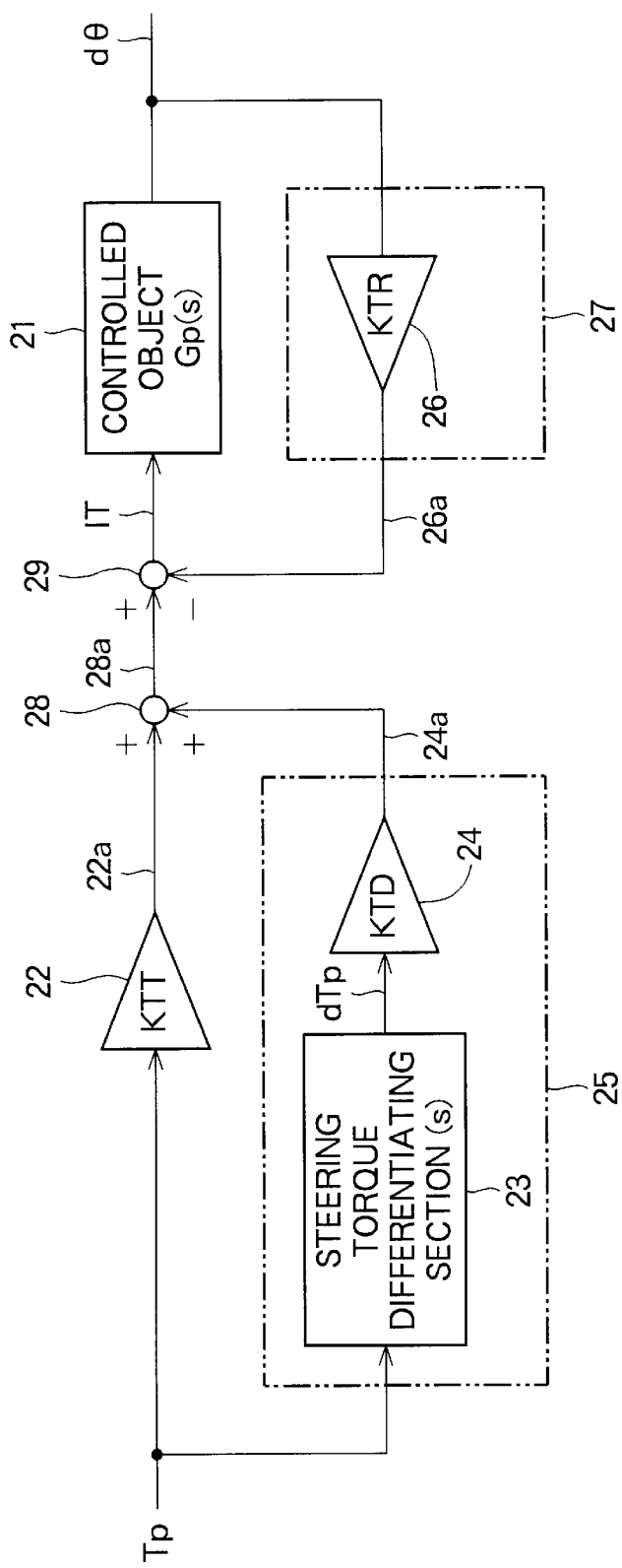
FIG. 4 is a block diagram showing a steering assist torque control system incorporated in the electric power steering apparatus according to the present invention.

FIG. 4 shows, in block diagram, the configuration of a steering assist torque control system incorporated in an electric power steering apparatus according to the present invention. Since the general arrangement and operation of the electric power steering apparatus are the same as those described above with reference to FIG. 1, no further description thereof is needed.

Figure 1:
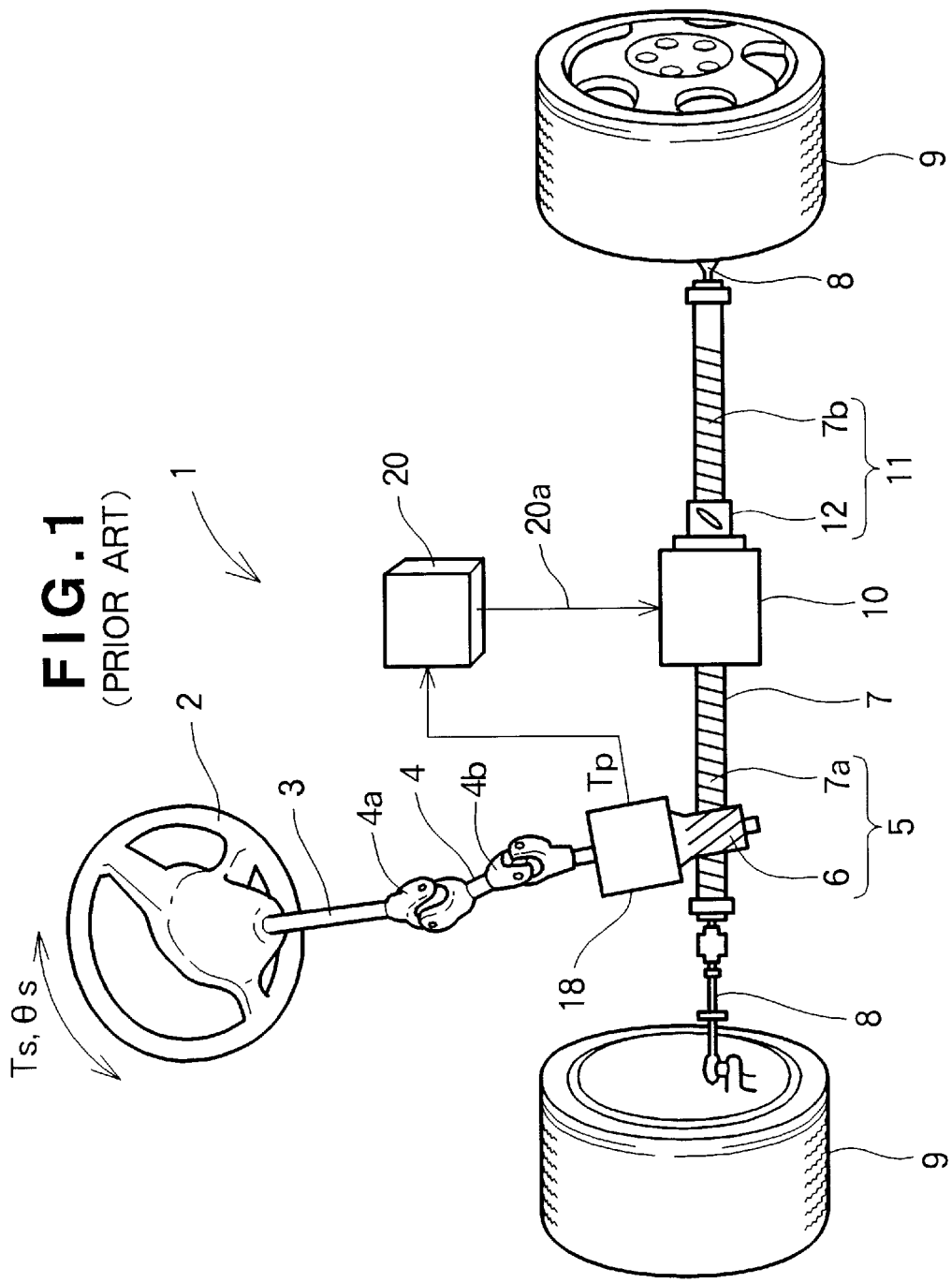
FIG. 1 is a diagrammatical view showing the general construction of an electric power steering apparatus to which the present invention pertains.
Figure 2:
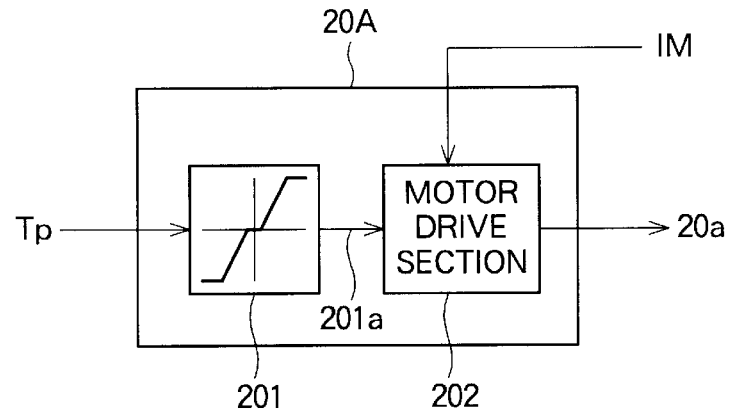
FIG. 2 is a block diagram showing a conventional control unit incorporated in the electric power steering apparatus.
Figure 3:
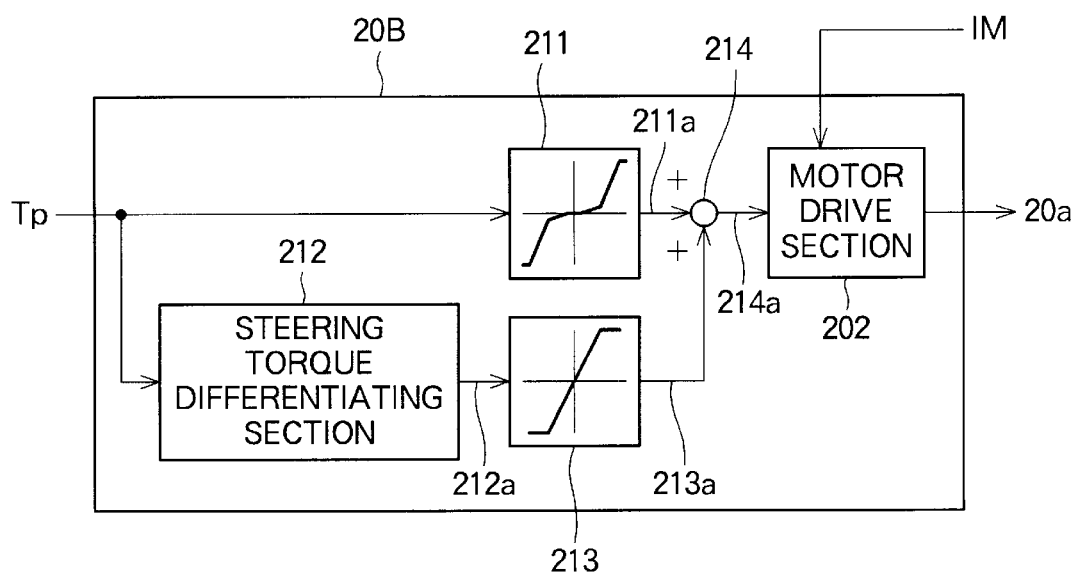
FIG. 3 is a view similar to FIG. 2, showing another conventional control unit.

In the steering assist torque control system shown in FIG. 4, a controlled object 21 corresponds to the electric motor 10 (FIG. 1) and the motor drive section 202 (FIG. 2). A main control value setting section 22 outputs a target assist torque 22a corresponding to the steering torque Tp and, hence, corresponds to the target assist torque setting section 201 shown in FIG. 2.

A steering torque differentiating section 23 outputs a differential value dTp of the steering torque Tp, and a differential-value correction value setting section 24 outputs a differential-value correction value 24a (KTD·Tp·s) corresponding to the differential steering torque value dTp. The steering torque differentiating section 23 and the differential-value correction value setting section 24 are regarded as a feed-forward (F/F) control section 25 which is provided to improve the response characteristic of the steering assist torque control system.

A steering-speed correction value setting section 26 outputs a steering-speed correction value 26a corresponding to the detected steering speed dθ. This section 26 is regarded as a feedback (F/B) control section 27.

A drive current value 22a corresponding to the steering torque Tp and a first target-value correction component 24a corresponding to the differential steering torque value dTp are corrected by adding them together at an adding section or adder 28. The resultant value 28a (corrected by addition at the adder 28) is corrected by subtracting therefrom a second target-value correction component 26a corresponding to the detected steering speed dθ. A target value IT is thus produced. Control of the controlled object 21 is carried out on the basis of the target value IT.

Gain KTT of the main control value setting section 22, gain KTD of the feed-forward control section 25, and gain KTR of the feedback control section 27 are set under the conditions described below so that the overall control system has a desired gain.

Figure 5:
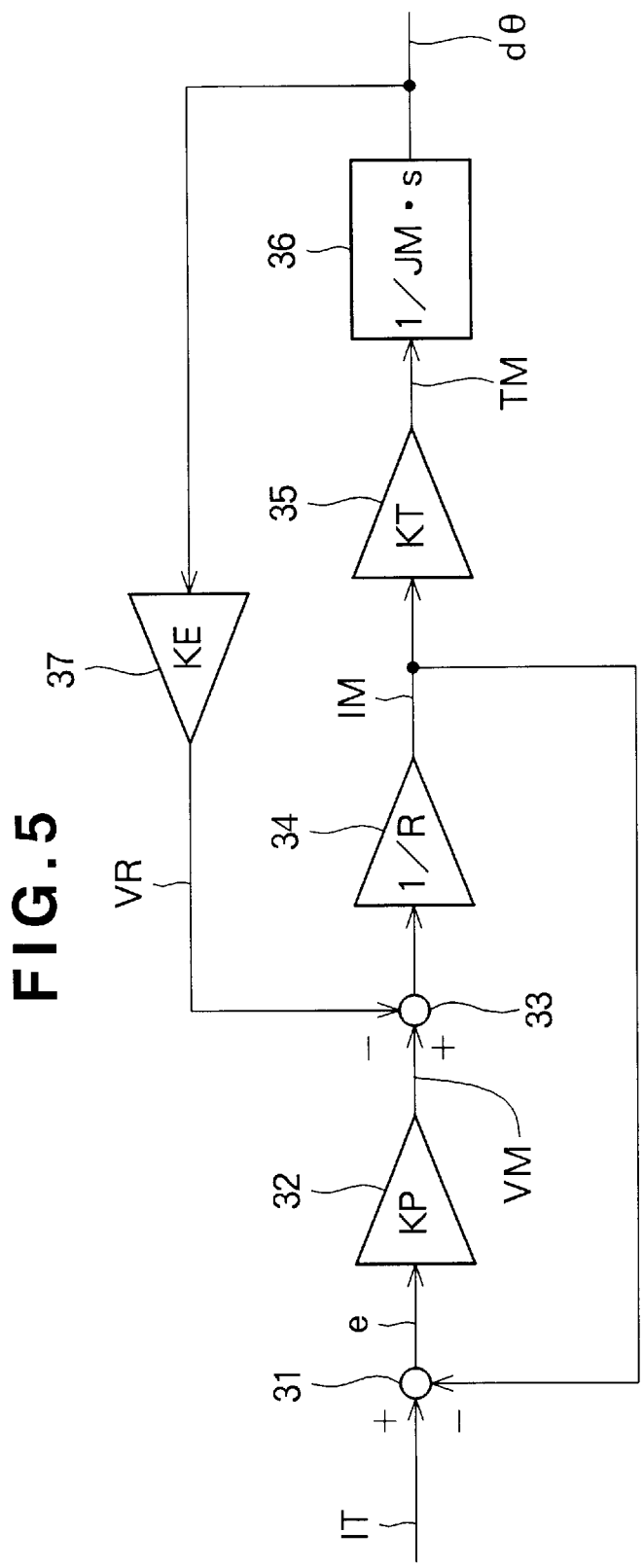
FIG. 5 is a block diagram showing the detailed configuration of a controlled object.

FIG. 5 shows structural details of the controlled object 21. It is considered that the controlled object 21 is composed of an offset calculating section 31 which outputs an offset e between the target value IT and a motor current IM actually flowing in the electric motor 10, a drive section 32 which supplies a drive voltage VM to the electric motor 10 on the basis of the offset e, an induced-voltage subtracting section 33 which subtracts a counter electromotive force (induced voltage) VR of the electric motor 10 from the drive voltage VM supplied from the drive section 32 so as to output a voltage actually supplied to the electric motor 10, a motor current generating section 34 which generates a motor current IM on the basis of the voltage actually supplied to the electric motor 10 (effective drive voltage), an assist torque generating section 35 which generates an assist torque (motor output torque) TM on the basis of the motor current IM, a rotational drive section 36 which generates a rotational 10 power at a rotational speed dθ corresponding to the assist torque TM, and a counter electromotive force generating section 37 which generates a counter electromotive force (induced voltage) corresponding to the rotational speed dθ.

Reference characters shown in FIG. 5 are defined as follows.

JM: inertial efficiency of the electric motor

R: resistance (winding resistance) of the electric motor

KT: torque constant of the electric motor

KE: counter electromotive force (induced voltage) constant of the electric motor KP: proportional gain of the motor drive section In FIG. 5, the drive section 32, supplying the drive voltage to the electric motor 10 in accordance with the offset e, assumes an arrangement which mainly supplies a drive voltage proportional to the offset e (proportional control). Derivative control based on a derivative term resulting from the offset and integral control based on an integral term resulting from the offset are omitted from consideration of the drive section 32. The rotational drive section 36 does not take account of a term relating to the viscosity. The rotational speed dθ means, in strict sense of the word, a rotational speed of rotational output power of the electric motor 10, but it may be replaced by a steering rotational speed.

By the equivalent transformation of the controlled object shown in FIG. 5, a transfer function Gp(s) of the controlled object 21 is given by the following Expression (1).

$$Gp(s) = \alpha \cdot KP/(JM \cdot s + \alpha KE) \quad (1)$$

where $\alpha = KT/(R+KP)$ and s is Laplace operator.

Substituting $\alpha \cdot KP/(JM \cdot s + \alpha \cdot KE)$ of Expression (1) for Gp(s) of the steering assist torque control system shown in FIG. 4 and rearranging it, we have a transfer function G(s) of the steering assist torque control system which is expressed by the following Expression (2).

$$G(s) = \alpha KP(KTD \cdot s + KTT)/\{JM \cdot s + \alpha(KP \cdot KTR + KE)\} \quad (2)$$

Accordingly, if the gain TKD of the feed-forward control section 25 and the gain KTR of the feedback control section 27 are set such that a conditional expression satisfies the following Expression (3), the transfer function G(s) of the steering assist torque control system will possesses the same input-to-output characteristic (gain) as a series gain element represented by a constant k. As a result, a steering power assist system having a response characteristic comparable to that of the manual steering system can be obtained.

$$\alpha \cdot KP \cdot KTD = k \cdot JM$$

$$KP \cdot KTT = k(KP \cdot KTR + KE) \quad (3)$$

Figure 6A:
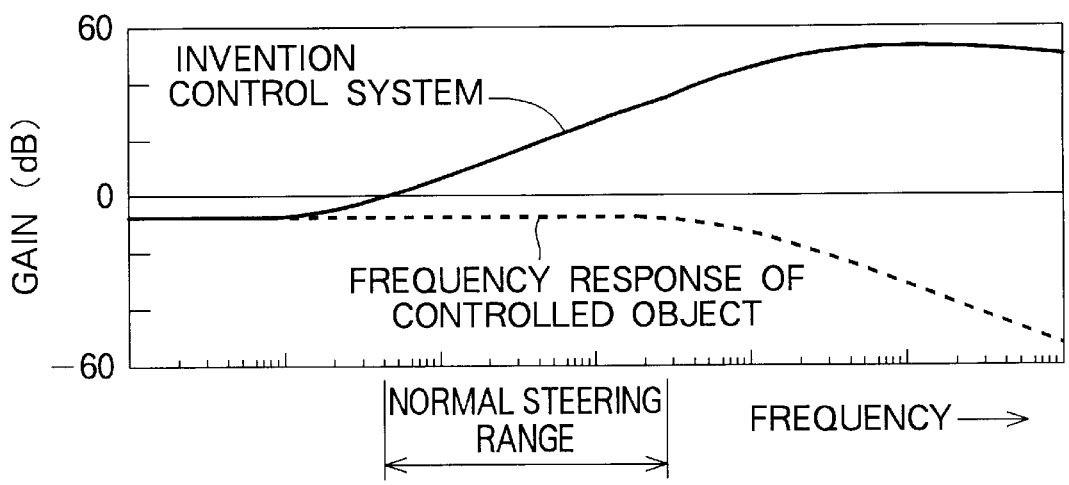
FIGS. 6A and 6B are graphs showing the frequency characteristics of the steering assist torque control system (steering power assist system) of the electric power steering apparatus.
Figure 6B:
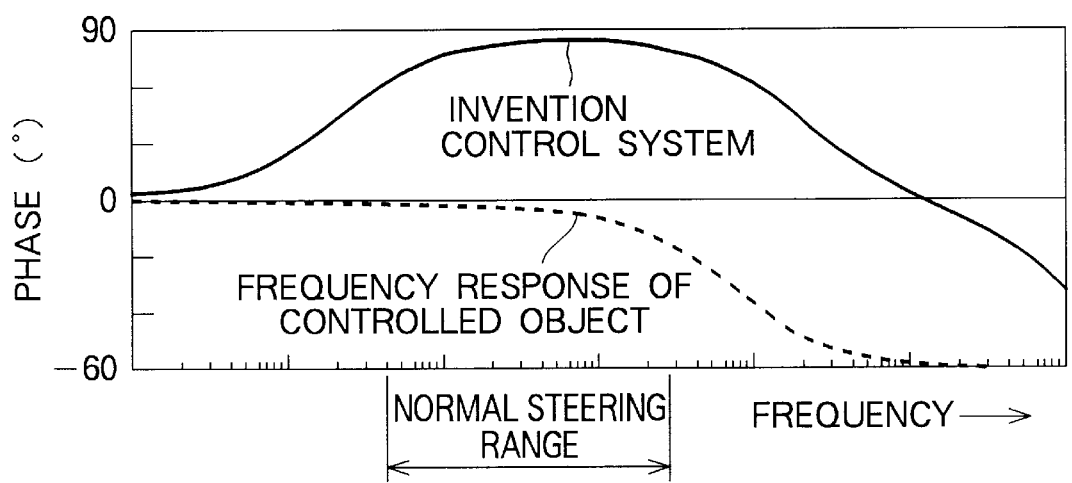

Taking into account of a delay in response to the steering input of a manual steering torque generating mechanism which is composed of a mechanical system including a steering gearbox containing therein the rack-and-pinion mechanism 5, the tie rods 8, and the front wheels 9 shown in FIG. 1, if the gain KTD of the feed-forward control section 25 and the gain KTR of the feedback control section 27 are set to satisfy the relation indicated by the following Expression (4) for making the transfer function G(s) of Expression (2) possess the same input-to-output characteristic as a phase-lead element, the result will be a steering power assist system superior in response characteristic to the manual steering system, as shown in FIGS. 6A and 6B.

$$\alpha \cdot KP(KTD \cdot s + KTT)/\{JM \cdot s + \alpha(KP \cdot KTR + KE)\} \quad (4)$$

In general, in the case of the transfer function G(s)=(T2·s+1)/(T1·s+1), if T2>T1, the phase of gain of a control system is advanced. Thus, a solution of Expression (2), which meets the condition T2>T1 where T1=JM/{α(KP·KTR+KE)} and T2=KTD/KTT, is KTD/KTT>JM/{α(KP·KTR+KE)}. The solution appears to satisfy the relation indicated by Expression (4) specified above.

FIGS. 6A and 6B are graphs showing the frequency characteristic of the steering power assist system (steering assist torque control system) of the electric power steering apparatus of the present invention, in which FIG. 6A shows the control gain, and FIG. 6B shows the frequency. In FIGS. 6A and 6B, the broken-lined curves represent the frequency characteristics of the controlled object, and the solid-lined curves represent the frequency characteristics of the steering power assist system (steering assist torque control system) according to the present invention. As appears clear from FIG. 6A and 6B, the steering power assist system of the present invention has an increased control gain in a normal steering range and phase of the gain is advanced. As a result, the steering power assist system has a response characteristic superior to that of the manual steering system.

As described above, an electric power steering system according to the present invention includes a steering assist torque control system in which a steering torque signal is input and a motor speed signal is output. The control system includes a main control value setting section having a gain KTT and setting a target assist torque value corresponding to the steering torque, a differential-value correction value setting section having a gain KTD and setting a differential-value correction value corresponding to a differential steering torque value, a motor having an inertial efficiency JM and a counter electromotive force (induced voltage) constant KE, a motor drive section incorporated in a controlled object and having a proportional gain KP, a steering speed correction value setting section having a gain KTR and setting a steering speed correction value corresponding to the motor speed signal. The ratio of the gain KTD to the gain KTT is set to satisfy the condition: $KTD/KTT > JM/\{\alpha(KP \cdot KTR + KE)\}$ where $\alpha = KT/(R+KP)$, R is the resistance (winding resistance) of the electric motor, and KT is the torque constant of the electric motor. With this arrangement, the phase of a gain of the steering assist torque control system is advanced, thereby improving the response characteristic to a level at least comparable to the manual steering mechanism.

Obviously, various minor changes and modifications are possible in the light of the above teaching. It is to be understood that within the scope of the appended claims the present invention may be practiced otherwise than as specifically described.

What is claimed is:

1. An electric power steering apparatus comprising:

an electric motor for providing an assist torque to a steering system;

a steering torque sensor for detecting a steering torque of said steering system and generating a steering torque signal indicative of the detected steering torque;

a steering torque differentiating section for obtaining a differential value of the steering torque and generating a differential steering torque signal corresponding to the differential value of the steering torque;

a motor speed sensor for detecting a rational speed of said electric motor and generating a motor speed signal corresponding to the detected rational speed of said electric motor;

a target current setting section for setting a target motor current on the basis of at least the steering torque, the differential value of the steering torque, and the rotational speed of said electric motor;

a current sensor for detecting a current actually flowing in said electric motor;

an offset calculating section for calculating an offset between the target motor current and the current actually flowing in said electric motor;

a motor drive section for driving said electric motor on the basis of the offset; and said electric motor, said steering torque sensor, said steering torque differentiating section, said motor speed sensor, said target current setting section, said offset calculating section and said motor drive section jointly forming a steering assist torque control system in which said steering torque signal is input and said motor speed signal is output, wherein said differential torque signal has a proportional gain KTD, said steering torque signal has a proportional gain KTT, said electric motor has an inertial efficiency JM, said motor drive section has a proportional gain KP, said motor speed signal has a proportional gain KTR, and said electric motor has a counter electromotive force constant KE, and wherein the ratio of said proportional gain of the differential steering torque signal to said proportional gain of the steering torque signal is set to satisfy a relation indicated by Expression: $KTD/KTT > JM/\{\alpha(KP \cdot KTR + KE)\}$ where $\alpha = KT/(R+KP)$, R is the resistance of said electric motor, and KT is the torque constant of said electric motor, thereby advancing the phase of a gain of said steering assist torque control system.

* * * * *